ABSTRACT OF THE DISCLOSURE

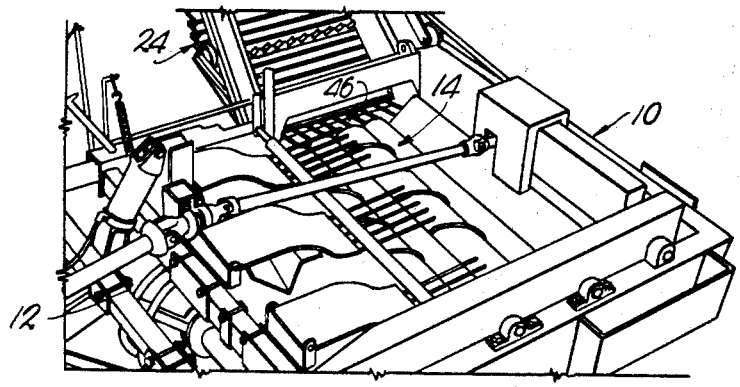
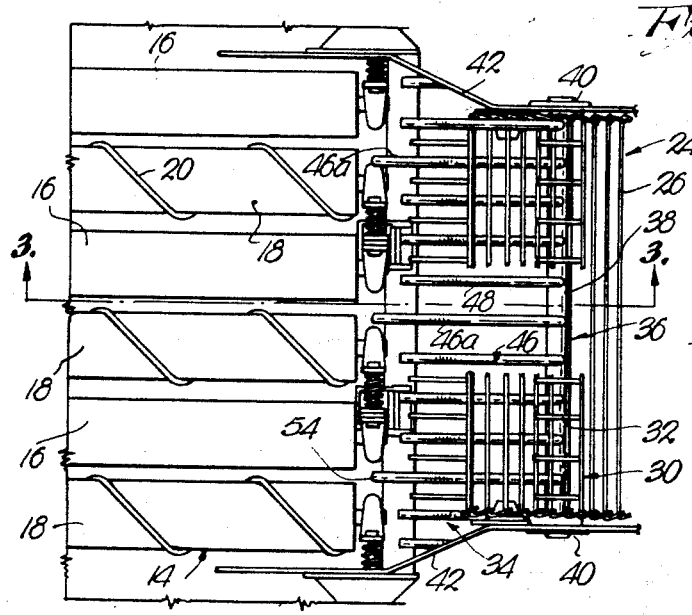
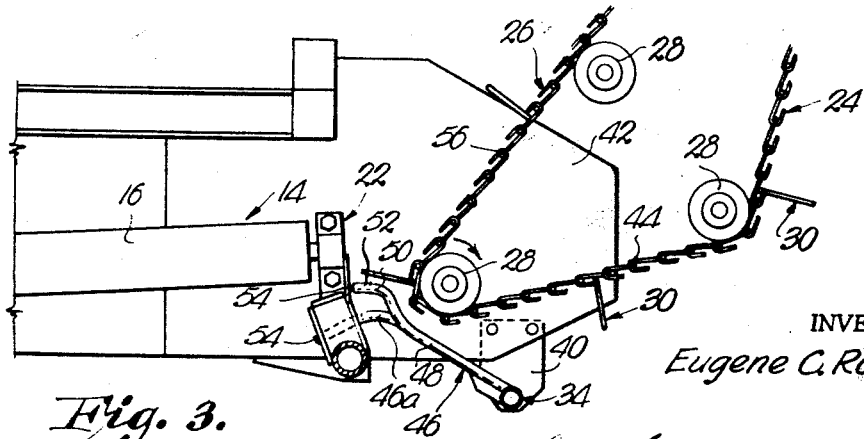
INVENTOR
Eugene C. Rollins
BY
Hovey, Schmidt, Johnson & Hovey
ATTORNEYS 3,438,496
COMB FOR BEET HARVESTERS
Eugene C. Rollins, Ogden, Utah, assignor to Hesston Manufacturing Company, Inc., Hesston, Kans., a corporation of Kansas
Filed Feb. 10, 1966, Ser. No. 526,500
Int. Cl. B07b *1/00, 1/10*
U.S. Cl. 209—241      2 Claims

A self-cleaning comb comprising an elongated support mounted beneath a flighted crop conveyor and remote from a crop and foreign material conveyor. A plurality of elongated teeth emanating from the support extend upwardly toward the discharge end of the crop and material conveyor. The terminal lengths of the teeth are curved downwardly to present a platform to receive the crop and hold it for pickup by the flights of the crop conveyor.

---

This invention relates to harvesting machines and, more particularly, to comb structure used in the cleaning of a harvested crop and to facilitate transfer of the crop from one conveyor to another.

It is the primary object of this invention to provide cleaning and comb structure which is capable of causing extraneous matter separated from the crop to gravitate away from the area of transfer of the crop from one conveyor to another, thereby preventing buildup of such matter at a point requiring excessive delays to accomplish cleaning of the machine.

Another object of the invention is to provide comb structure having improved cleaning capabilities with inherent self-cleaning characteristics.

Still a further object of this invention is the provision of such comb structure wherein the teeth of the comb are configured to minimize the possibility of damage to the harvested crop while transfer from one conveyor to another is effected.

In the drawing:

FIGURE 1 is a fragmentary, perspective view of a beet harvesting machine of the kind which may advantageously utilize the comb structure of this invention;

FIG. 2 is a fragmentary, top plan view of the machine of FIG. 1, parts being broken away to reveal the comb of this invention installed in operative position; and FIG. 3 is a vertical, cross-sectional view taken along line 3—3 of FIG. 2.

A harvesting machine 10 adapted to be towed over a field includes digging structure 12 which may be utilized for severing the product, such as sugar beets or the like, from the ground. As structure 12 elevates the material including the harvested crop and foreign matter, such material is conveyed toward the rear of the machine and the material is deposited upon a transversely extending conveyor 14.

Conveyor 14 comprises a series of pairs of rolls 16 and 18. The rolls of each pair thereof are operated in opposite directions so that the peripheral surface of rolls 16 is rotated toward roll 18 and the peripheral surface of roll 18 is rotated toward its corresponding roll 16. A helical rib 20 is provided for each of the rolls 18 in order to cause the material deposited on conveyor 14 to advance toward the discharge end 22 of conveyor 14. It will be noted that each roll 16 is spaced slightly apart from its corresponding roll 18 and the conveyor 14 is inclined upwardly toward the discharge end 22 thereof. Thus, the counterrotation of the respective rolls 16 and 18 impart a scrubbing and pulling action to the material deposited thereon. The extraneous matter is thereby largely separated from the harvested crop and the matter gravitates between the rolls 16 and 18 while the harvested crop remains on top of the rolls inasmuch as it is too large to be pulled between the counterrotating rolls.

A crop conveyor 24 is disposed adjacent the discharge end 22 of conveyor 14 and includes an endless chain 26 trained around a plurality of rollers 28 for movement through a path of travel adjacent end 22. Chain 26 is provided with a plurality of flights 30 of outwardly projecting fingers 32.

Flights 30 are caused to intermittently sweep upwardly past discharge end 22 of conveyor 14 for conveying the crop from end 22 as the crop is discharged from conveyor 14. Since the crop may discharge substantially continuously from conveyor 14, it is necessary to provide structure for supporting the crop in position to be picked up by the flights 30 of the crop conveyor 24. To this end, the comb structure 34 of this invention includes an elongated, transversely extending support 36 which may comprise a tubular member 38 and a pair of mounting brackets 40 integral with member 38 and adapted to be rigidly secured to the side extensions 42 of the frame of machine 10. Brackets 40 are configured to dispose support 36 a substantial distance below the lowermost stretch 44 of chain 26.

A plurality of elongated, spaced-apart teeth 46 are integrally secured to member 38 and extend upwardly and inwardly toward discharge end 22 of conveyor 14. Teeth 46 include elongated stretches 48 and terminal lengths 50 bent at an angle from stretches 48 to present a material platform 52 in position to receive material from conveyor 14 and to suspend the crop contained in such material in position to be picked up by the next succeeding flight 30 of conveyor 24 for conveying the crop away from end 22 and toward a crop hopper or the like. It should be noted that the terminal lengths 50 of teeth 46 terminate in free ends 54 adjacent the discharge end 22 of conveyor 14. The spacing between teeth 46 is such that the fingers 32 of flights 30 interleave between teeth 46 as the flights are successively rotated toward discharge end 22 of conveyor 14.

Certain of the teeth designated 46a are provided with terminal lengths extending downwardly and inwardly beneath discharge end 22 of conveyor 14. The teeth 46a are disposed generally between each pair of rolls 16 and 18 for preventing certain portions of the crop, for example, the elongated roots of sugar beets, from gravitating to positions where they could become lodged to cause tearing or cutting of the beets when fingers 32 pass through the vicinity of end 22.

It will be appreciated that the location of the free ends 54 of teeth 42 adjacent discharge end 22 presents very little structure to catch or hold extraneous material which discharges with the crop from conveyor 14. On the contrary, the crop is received on the relatively smooth platform 52 with substantially no injury to the crop. The crop is supported on the platform until it is picked up by the succeeding flight 30 of conveyor 24. The extraneous matter is caused to either drop through the spacing between teeth 46 or, if the matter is stringy, such as long weeds, vines or the like, it gravitates along the downwardly and outwardly inclined stretches 48. The free ends 54 enhance the separation of extraneous matter from the crop. Manifestly, most of such matter will drop from teeth 46 in the course of its travel toward support 36. However, such matter that remains on the comb structure 34 and is retained by support 36 is in position substantially beneath the lower stretch 44 of chain 26 and is, therefore, not in position to obstruct the orderly removal of the crop from conveyors 14 and onto the upwardly inclined stretch 56 of chain 26. By virtue of the progressively increasing spacing between the elongated stretches 48 of teeth 46, and crop conveyor 24 as support 36 of comb structure is approached the extraneous matter is thereby carried away from conveyor 24 while the matter is separated from the harvested crop. It will be readily apparent that little extraneous matter is permitted to gravitate from discharge end 22 of conveyor 14 to become lodged on supporting structure located immediately beneath end 22.

The cross-sectional configuration of each tooth 46 is desirably uniform throughout the length of the tooth, thereby presenting minimum impedance to the natural tendency of the foreign matter to gravitate downwardly along the tooth. It has been found that a circular cross section for the teeth provides quite satisfactory results.

Having thus described the invention, what is claimed as new and desired to be secured by Letters Patent is:

1. In the handling of material consisting of a harvested crop and foreign matter, a material conveyor having a discharge end, a crop conveyor having fingered flights disposed to receive the crop discharged by the material conveyor, and comb structure for receiving said material from the material conveyor and separating said matter from the material, said structure comprising:
   a plurality of elongated teeth adjacent the conveyors; and
   a support for said teeth remote from said discharge end,
   the teeth extending from said support toward said discharge end, terminating in free ends adjacent the latter,
   the teeth having terminal lengths at said free ends thereof disposed to present a material platform for receiving the material from the material conveyor,
   the teeth being spaced apart for gravitation of said foreign matter therefrom while retaining the crop,
   said teeth being disposed generally parallel to the path of travel of said flights for interleaving with the fingers of said flights during operation of the crop conveyor, said free ends being disposed downstream of the path of travel of said flights from said support,
   the terminal lengths of certain of said teeth extending downwardly and inwardly beneath said discharge end for receiving portions of said crop depending from the material conveyor at the discharge end.

2. In the handling of material consisting of a harvested crop and foreign matter, a material conveyor having a discharge end, a crop conveyor having fingered flights disposed to receive the crop discharged by the material conveyor, and comb structure for receiving said material from the material conveyor and separating said matter from the material, said structure comprising:
   a plurality of elongated teeth adjacent the conveyors; and
   a support for said teeth remote from said discharge end,
   the teeth extending from said support toward said discharge end, terminating in free ends adjacent the latter,
   the teeth having terminal lengths at said free ends thereof disposed to present a material platform for receiving the material from the material conveyor,
   the teeth being spaced apart for gravitation of said foreign matter therefrom while retaining the crop,
   said teeth being disposed generally parallel to the path of travel of said flights for interleaving with the fingers of said flights during operation of the crop conveyor, said free ends being disposed downstream of the path of travel of said flights from said support,
   said teeth having stretches between their terminal lengths and said support sloping downwardly and outwardly from said discharge end for directing foreign matter away from the conveyors,
   said stretches being disposed beneath the crop conveyor in spaced relationship thereto, the spacing between the stretches and the crop conveyor progressively increasing as the support is approached.

References Cited

UNITED STATES PATENTS

| | | | |
|---|---|---|---|
| 2,578,189 | 12/1951 | Johnston | 171—117 X |
| 808,264 | 12/1905 | Vandegrift | 130—5 |
| 1,321,851 | 11/1919 | Rink | 209—324 |
| 1,351,948 | 9/1920 | Fowler. | |
| 1,375,578 | 4/1921 | Fields | 209—393 X |
| 1,439,699 | 12/1922 | Fisk | 209—393 X |
| 1,485,872 | 3/1924 | Nelson | 209—393 X |
| 2,214,920 | 9/1940 | Calkins | 209—324 X |

HARRY B. THORNTON, *Primary Examiner.*

ROBERT HALPER, *Assistant Examiner.*

U.S. Cl. X.R.

56—18; 130—5; 209—393